United States Patent
Lang

(10) Patent No.: US 9,903,330 B2
(45) Date of Patent: Feb. 27, 2018

(54) HOLDER FOR FASTENING A COMPONENT TO AN INTERNAL COMBUSTION ENGINE

(71) Applicant: Robert Bosch GmbH, Stuttgart (DE)

(72) Inventor: Klaus Lang, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 135 days.

(21) Appl. No.: 14/396,135

(22) PCT Filed: Mar. 27, 2013

(86) PCT No.: PCT/EP2013/056573
§ 371 (c)(1),
(2) Date: Oct. 22, 2014

(87) PCT Pub. No.: WO2013/160063
PCT Pub. Date: Oct. 31, 2013

(65) Prior Publication Data
US 2015/0090229 A1    Apr. 2, 2015

(30) Foreign Application Priority Data

Apr. 26, 2012    (DE) .................. 10 2012 206 904

(51) Int. Cl.
*F02M 61/14*    (2006.01)
*F02F 11/00*    (2006.01)
(Continued)

(52) U.S. Cl.
CPC .......... *F02M 61/14* (2013.01); *F02M 55/025* (2013.01); *F02M 61/145* (2013.01);
(Continued)

(58) Field of Classification Search
CPC .... F02M 61/14; F02M 69/465; F02M 61/145; F02M 61/16; F02M 2200/85;
(Continued)

(56) References Cited

U.S. PATENT DOCUMENTS 5,178,357 A * 1/1993 Platus .................... F16F 3/026
248/619
7,793,639 B2 * 9/2010 Hunt .................... F02M 55/025
123/470
(Continued)

FOREIGN PATENT DOCUMENTS

CN        101926517 A    12/2010
WO     2010/101693       9/2010
(Continued)

OTHER PUBLICATIONS

WO2010/101693, Robert Schaser, Bushing Assembly, Publicaiton Date: Sep. 2010, Illinois Tool Works Inc.*
WO2010/101693, Robert Schaser, Bushing Assembly, Sep. 2010.*

*Primary Examiner* — Lindsay Low
*Assistant Examiner* — Syed O Hasan
(74) *Attorney, Agent, or Firm* — Norton Rose Fulbright US LLP; Gerard Messina

(57) ABSTRACT

A holder for fastening at least one component, particularly a fuel distributor, to an internal combustion engine. The holder includes an elastically deformable damping element, a holder body and a spring element, which are situated lying one behind the other with reference to an axis. In response to an assembly using the fastening arrangement, a prestressing of the spring element and a prestressing of the damping element are made possible. Furthermore, a fuel injection system is described having a fuel distributor and such a holder, which is used for fastening the fuel distributor on an internal combustion engine.

12 Claims, 3 Drawing Sheets

(51) Int. Cl.
  *F02M 55/02*    (2006.01)
  *F02M 69/46*    (2006.01)
  *F02M 61/16*    (2006.01)
  *F02F 7/00*     (2006.01)
  *F16J 15/12*    (2006.01)

(52) U.S. Cl.
  CPC .......... *F02M 61/16* (2013.01); *F02M 69/465* (2013.01); *F02F 7/006* (2013.01); *F02F 11/002* (2013.01); *F02M 2200/85* (2013.01); *F02M 2200/855* (2013.01); *F02M 2200/857* (2013.01); *F02M 2200/9015* (2013.01); *F16J 15/123* (2013.01)

(58) Field of Classification Search
  CPC ......... F02M 2200/855; F02M 2200/857; F16J 15/123; F16J 15/0818; F16J 15/0825; F02F 11/002; F02F 7/006
  USPC ........................... 123/470, 468; 277/313, 591
  See application file for complete search history.

(56) References Cited

U.S. PATENT DOCUMENTS 8,469,004 B2 *  6/2013  Solferino ............... F02M 61/14
                                                    123/470
2008/0075403 A1   3/2008  Holt et al.

FOREIGN PATENT DOCUMENTS

| WO | 2013/063408 | 5/2013 |
| WO | 2013/074280 | 5/2013 |

* cited by examiner

HOLDER FOR FASTENING A COMPONENT TO AN INTERNAL COMBUSTION ENGINE

FIELD OF THE INVENTION

The present invention relates to a holder for fastening at least one component, especially a fuel distributor, to an internal combustion engine. The present invention especially relates to the field of fuel injection systems of internal combustion engines.

BACKGROUND INFORMATION

A device is discussed in U.S. Pat. No. 7,793,639 B2 which is used for noise reduction for an internal combustion engine with regard to vibrations of a fuel distributor. The device has a retaining clamp which is used for fastening the fuel distributor to a cylinder head.

The device from U.S. Pat. No. 7,793,639 B2 has the disadvantage that the specified damping properties deteriorate with time. This may also lead to a greatly increased wear of the components, by the vibrational stressing of the engine.

SUMMARY OF THE INVENTION

The bearing holder according to the present invention, having the features described herein, and the fuel injection system according to the present invention having the features described herein, have the advantage of ensuring better vibration damping over their service life. A limitation of the vibrational stressing may thereby also be ensured over the service life. One may thereby guard against mechanical failure. More specifically, it provides the advantage of ensuring sufficient noise damping even after an extended operating time.

The measures set forth in the dependent claims make possible advantageous developments of the holder described herein and of the fuel injection system described herein.

The holder is used, for instance, for fastening a fuel distributor of a fuel injection system to a cylinder head of an internal combustion engine. In this instance, the fuel distributor is used for fuel storage on the internal combustion engine. Pressure pulsations are induced which are able to give rise to noises, because of pressure fluctuations in the fuel distributor and injectors connected to the fuel distributor. The pressure pulsations, among other things, may be passed on in the form of structure-borne noise at the contact points to the cylinder head. In this case, a damping element is used that ensures damping at the interface to the cylinder head. In this connection, a certain decoupling may be achieved because of the damping element.

The damping element is advantageously prestressed axially. In particular, the elastically deformable damping element may be configured based on at least one elastomer. Advantageous damping properties are achieved by such a configuration. It is true that over the service life a certain creeping or settling of the elastomer may occur which, when viewed in isolation, leads to a reduction in the desired prestressing of the damping element. The loss or, in the end state, the non-presence of the prestressing would lead to a greatly increased wear of the components by the vibrational stressing of the engine. Within certain limits, this may be countered by using very high-grade elastomers and very precisely manufactured attachment parts. These measures are possible, but they tend to be connected with correspondingly high costs. It is further conceivable that, to minimize the settling effect, the stressing in the elastomer is set low, which would bring with it, however, a correspondingly great requirement for installation space. The requirements on the material of the damping element, particularly of the elastomer, on the production precision on the add-on parts and on the size of the installation space are considerably reduced by the spring element and its prestressing.

Because of the embodiment having the spring element, which is prestressed in the mounted state, a desired minimum prestressing of the damping element is ensured. Thereby the desired decoupling is ensured even at large tolerances of the add-on parts and at large settling effects. For this purpose, the spring element may be embodied as a metallic spring element. It is especially advantageous that the spring element is configured as a disk-shaped or wave-shaped spring element. The spring element may be configured as a helical spring. The function of prestressing may hereby advantageously be put into the spring element and the function of the damping may be ensured by the damping element. The metallic spring element, which ensures the minimum prestressing, is not affected by the settling effect, in contrast to the damping element. Consequently, its functioning is ensured over a very long service life. The requirements on the accuracy of the add-on parts and on the material of the damping element are also reduced thereby. As a result, a reduction in costs is made possible with respect to a desired mode of action. This also relates to the embodiment with regard to a specified installation space. The installation space required may especially be reduced.

It is advantageous that the holder body is situated between the damping element and the spring element. The holder body is thereby able to form an advantageous support, on the one side for the damping element and on the other side for the spring element.

It is also advantageous that a further elastically deformable damping element is provided, and that the holder body is situated between the elastically deformable damping element and the further elastically deformable damping element. Thereby a vibrational decoupling may be further improved, since the holder body is vibrationally damped along the axis of the fastening arrangement, in both directions, as it were.

It is advantageous that a directional quantity of the spring element in the unstressed state is less than a directional quantity of the damping element and that the directional quantity of the spring element in the assembled state is greater than the directional quantity of the damping element. The spring element may especially be prestressed up to its end position. In this end position, for example, a disk-shaped or wave-shaped spring element may be pressed flat. By directional quantity of the spring element in the unstressed state one should understand especially a spring constant of the spring element in the unstressed state. The directional quantity describes the relationship between the force acting in the axial direction and the deflection caused thereby from the position of rest, or rather the relationship of the deflection from the at rest position and the reflecting force which acts counter to the deflection. In this connection, the concept of the directional quantity should be understood generally, and in particular, linear relationships between the force and the deflection are also not possible. The directional quantity of the damping element may be determined especially from the modulus of elasticity of the damping element, which is a material property. In an hollow cylindrical embodiment of the damping element, the directional quantity of the damping element is yielded as a quotient having a dividend that is the product of the modulus of elasticity and the effective cross sectional area, and a divisor that is equal to the length of the damping element in its initial length.

Thus, the spring element and the damping element are connected in series, so to speak. In the unstressed state, the stiffness of the spring element is clearly less than the stiffness of the damping element. During assembly, the spring element is thereby first pressed together. During assembly, the spring element may be prestressed completely, that is, it is pressed together to its end position. The low stiffness of the spring element leads to large excursions being taken up by the spring element at already comparatively small forces. The force required to press together the spring element completely then represents the lowest prestress force which the damping element sees in a durable manner. In particular, this is the case if a great relaxation occurs in the damping element.

The larger directional quantity in the assembled state may thus come about especially in that the spring element has been pressed down completely to a stop.

In an advantageous manner, the elastically deformable damping element, the holder body and the spring element are situated one after the other between a first stressing element and a second stressing element. Because of this, an advantageous subassembly may be formed which is simple to mount. In addition, via the stressing elements, defined contact surfaces are specified, on the one hand, for the holder body and, on the other hand, for the spring element. Besides that, it may be ensured via the stressing elements that the damping element, the holder body and the spring element are positioned with respect to one another in a specified manner.

It is also advantageous that an axial bore extends through the elastically deformable damping element, the holder body and the spring element, through which a bolt of the fastening arrangement penetrates. In this instance, it is further advantageous that the bolt of the fastening arrangement has at least one thread that is used for fastening to the internal combustion engine, the prestressing of the spring element and the prestressing of the damping element being applicable via screwing in the thread. This allows a compact configuration of the holder. In addition, this also makes possible an advantageous force transmission and thus a homogeneous stressing both in the elastically deformable damping element and in the spring element.

Exemplary embodiments of the present invention are described in greater detail in the following description with reference to the appended drawings, in which corresponding elements are provided with the same reference numerals.

DETAILED DESCRIPTION

Figure 1:
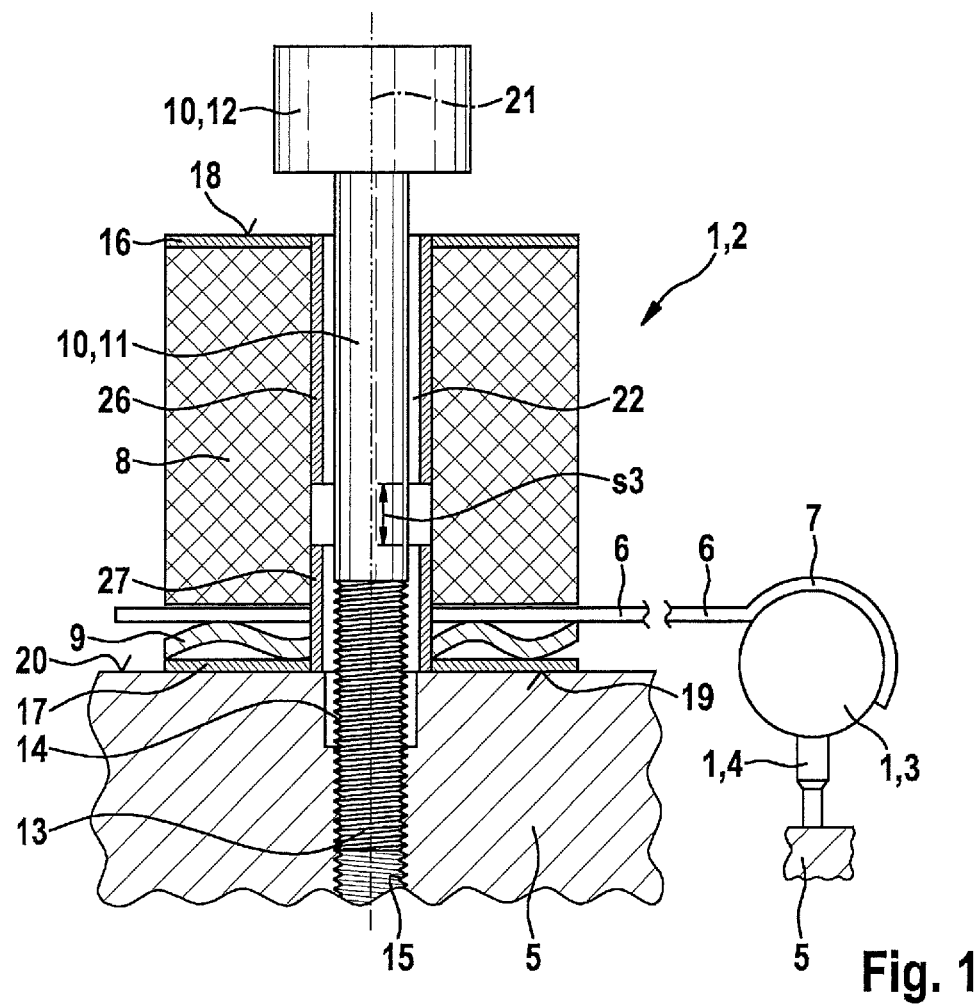
FIG. 1 shows a fuel injection system having a holder, which is used to fasten the fuel distributor to an internal combustion engine, in a cutaway, schematic sectional representation corresponding to a first exemplary embodiment of the present invention.

FIG. 1 shows a fuel injection system 1 having a holder 2, which is used to fasten fuel distributor 3 as well as injectors 4 on an internal combustion engine 5, in a cutaway, schematic sectional representation according to a first exemplary embodiment. In this exemplary embodiment, fuel injection system 1 includes holder 2, fuel distributor 3 and a plurality of injectors 4, of which only injector 4 is shown in FIG. 1. Fuel injection system 1 may also include further components. In FIG. 1, to simplify the illustration, a cylinder head is shown schematically for internal combustion engine 5. Fuel injection system 1 and internal combustion engine 5 are shown without attention being paid to a suitable scale or uniform size relationships.

Holder 2 has a holder body 6. A receptacle 7 of holder body 6 encompasses fuel distributor 3, which in this exemplary embodiment is configured as a tube-shaped fuel rail 3. Fuel distributor 3 is thereby fastened to the cylinder head of internal combustion engine 5. At the same time, an injector 4 is fixed to be situated between fuel distributor 3 and the cylinder head of internal combustion engine 5.

Holder 2 also has an elastically deformable damping element 8 and a spring element 9. Fastening arrangement 10 is also provided, which have a bolt 11 and a head 12. At its end 13, bolt 11 has a screw thread 14. Furthermore, the cylinder head of internal combustion engine 5 has a tapped hole 15, into which end 13 of bolt 11 of fastening arrangement 10 is screwed using its thread 14.

Elastically deformable damping element 8, holder body 6 and spring element 9 are situated lying one behind the other between a first stressing element 16 and a second stressing element 17. FIG. 1 shows a state during the mounting of holder 2. By the additional screwing in of fastening arrangement 10 into tapped bore 15, head 12 reaches an upper side 18 of first stressing element 16. Second stressing element 17 is supported with a support side 19 on an upper side 20 of the cylinder head of internal combustion engine 5. By further screwing in, damping element 8, holder body 6 and spring element 9, which are situated lying one behind the other with respect to an axis 21 of fastening arrangement 10, are pressed together between the two stressing elements 16, 17. Holder body 6 is formed of an incompressible solid, especially a metal. Damping element 8 is produced in an elastically deformable manner, so that an elastic deformability exists, particularly along axis 21. Spring element 9 is configured as a metallic spring element 9. In this exemplary embodiment, spring element 9 is additionally configured as a wave-shaped spring element 9. In this connection, a disk-shaped configuration of spring element 9 is also possible.

A directional quantity of spring element 9 in the unstressed state is less than a directional quantity of damping element 8. During further screwing in of fastening arrangement 10 into tapped bore 15, spring element 9 is first pressed together thereby. The directional quantity of spring element 9 and the directional quantity of damping element 8 in the unstressed state may be coordinated with each other in such a way that spring element 9 is completely pressed down. Thereby, spring element 9 is pressed to be level or flat. In the state of being pressed flat, spring element 9 has a very large directional quantity, which is determined by the modulus of elasticity of the metallic material of spring element 9, for example. A further compression of spring element 9 is therefore not possible. During screwing in, if spring element 9 has just been pressed flat, then at this point damping element 8 is only prestressed to a small extent. During further screwing in of fastening arrangement 10, elastically deformable damping element 8 is thus prestressed. In this case, a suitable prestressing force may be specified which is able to be set via screwing thread 14 at end 13 of bolt 11 of fastening arrangement 10 into tapped bore 15. The prestressing of spring element 9 and the prestressing of damping element 8 are particularly able to be applied via screwing thread 14 into tapped bore 15.

Elastically deformable damping element 8, holder body 6 and spring element 9 are situated one behind the other with reference to axis 21. In this connection, the sequence is not fixed. However, it is advantageous that holder body 6 is situated between damping element 8 and the spring element 9. This brings about an advantageous contact of damping element 8 to holder body 6. Furthermore, one may thereby achieve an advantageous contact of spring element 9 to holder body 6. A further advantageous embodiment is also described with reference to FIG. 3.

An axial bore 22 extends through elastically deformable damping element 8, holder body 6 and spring element 9. Bolt 11 of fastening arrangement 10 penetrates through this axial bore 22. In addition, first stressing element 16 has a sleeve-shaped part 26 which extends partially through axial bore 22. In addition, second stressing element 17 has a sleeve-shaped part 27 which also extends partially through axial bore 22. In this exemplary embodiment, damping element 8 lies inside both on sleeve-shaped part 26 of first stressing element 16 and on sleeve-shaped part 27 of second stressing element 17. Spring element 9 and holder body 6 lie inside against sleeve-shaped part 27 of second stressing element 17. The individual elements of holder 2 are thereby positioned with respect to one another relative to axis 21.

Figure 2:
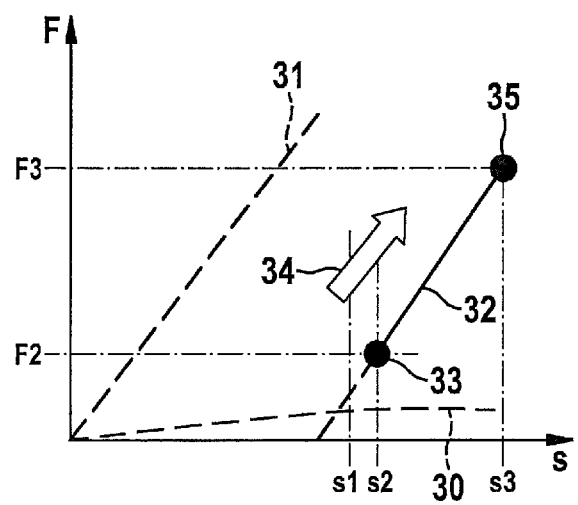
FIG. 2 shows a diagram to explain the functioning method of the holder of the first exemplary embodiment of the present invention.

FIG. 2 shows a diagram to illustrate the mode of operation of holder 2, corresponding to the first specific embodiment. In the diagram, on the abscissa, an excursion length s for prestressing along axis 21 is entered. On the ordinate, prestressing force F is entered as a function of this excursion length s. In the diagram, a characteristic curve 30 for illustrating the directional quantity of spring element 9 at low stressing, particularly in the unstressed state, is shown, and a characteristic curve 31 for illustrating the directional quantity of damping element 8. Upon the assembly of holder 2 and screwing it in, first of all, spring element 9 is compressed along characteristic curve 30, while damping element 8 experiences a slight compression along line 32. Approximately beginning at excursion length s1, spring element 9 is completely pressed together. The directional quantity of the spring element is therefore greater than the directional quantity of damping element 8. For, the directional quantity of spring element 9 is then determined essentially by the modulus of elasticity. Consequently, at a further compression, damping element 8 is prestressed further. This further compression is illustrated by a line 32. Line 32 comes about by the parallel shifting of characteristic curve 31. When excursion route s2 is reached, a reaction force F2 comes about which amounts to 100 N, for example. This may correspond to a possible point 33 during assembly. It should be noted at this point that, during the assembly, up to the reaching of point 33, or rather while tightening fastening arrangement 10 up to excursion route s2, certain superpositions in the compression of spring element 9 and the compression of damping element 8 may also come about. The largest proportion of excursion route s2 is however applied by metallic spring element 9, since it yields more greatly based on its lower stiffness. The large excursion is suitable for taking up large tolerances of the add-on parts. Damping element 8 takes up only a lower excursion proportion, so that the stresses in damping element 8 at point 33 are low and the settling inclination at this point 33 is close to zero.

Since spring element 9 is now completely prestressed, the further compression is taken up by damping element 8, which takes place along line 32. This is illustrated by an arrow 34. The prestressing may be increased up to a working point 35, for example. In this instance, during the prestressing, a total excursion length s3 has been covered. Excursion length s3 may be limited by the distance of sleeve-shaped parts 26, 27 of stressing elements 16, 17. Excursion route s3 is then simultaneously the maximum possible compression route s3. Consequently, working point 35 may be specified constructionally, which considerably simplifies the assembly. Damping element 8 may be configured so that a relatively low deformation takes place with reference to the hollow cylinder-shaped initial shape, for example. This may be achieved in that the height is greater than the diameter of the damping element. This also makes possible the implementation of the function at smaller diameters of damping element 8.

At working point 35, damping element 8 ensures the desired damping function. If, over the service life, settling effects, that cannot be avoided, occur in the elastic material of damping element 8, it is ensured by spring element 9 that the prestressing decreases to only barely above the prestressing of spring element 9. This permanently ensures that a minimum prestressing of damping element 8 exists, or of the entire composite construction. This reliably prevents the lifting of damping element 8, and a wear connected with it. Therefore, no play occurs along axis 21 over the service life, which would make possible an undamped motion of holder body 6 along axis 21.

As a further advantage, a comparatively hard elastomer may be used in the configuration of damping element 8, which is shown in FIG. 2 by a steep characteristic curve 31. At working point 35, a reaction force at the level of 500 N may come about, for example. The tolerance compensation is ensured via spring element 9, in this case.

Figure 3:
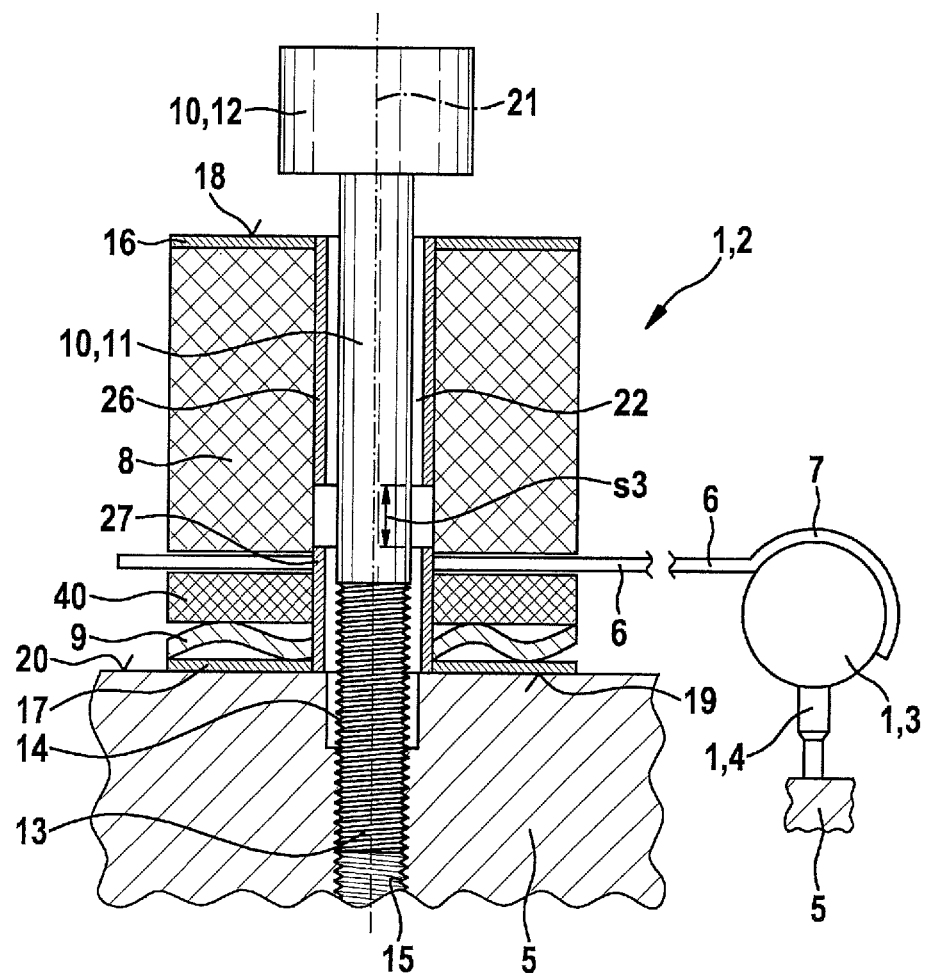
FIG. 3 shows a fuel injection system having a holder, which is used to fasten the fuel distributor on an internal combustion engine, in a cutaway, schematic sectional representation corresponding to a second exemplary embodiment of the present invention.

FIG. 3 shows a fuel injection system 1 having a holder 2, which is used to fasten fuel distributor 3 to an internal combustion engine 5, in a cutaway, schematic sectional representation according to a second exemplary embodiment. In this exemplary embodiment, a further elastically deformable damping element 40 is provided. In this case, holder body 6 is situated between the elastically deformable damping element 8 and additional elastically deformable damping element 40. Damping elements 8, 40 may be made of an elastomer, for example. In this configuration, the two damping elements 8, 40 may particularly be based on the same material, especially the same elastomer. The arrangement having the two damping elements 8, 40 has the advantage that, in both directions along axis 21, an advantageous damping of holder body 6 is made possible.

Figure 4:
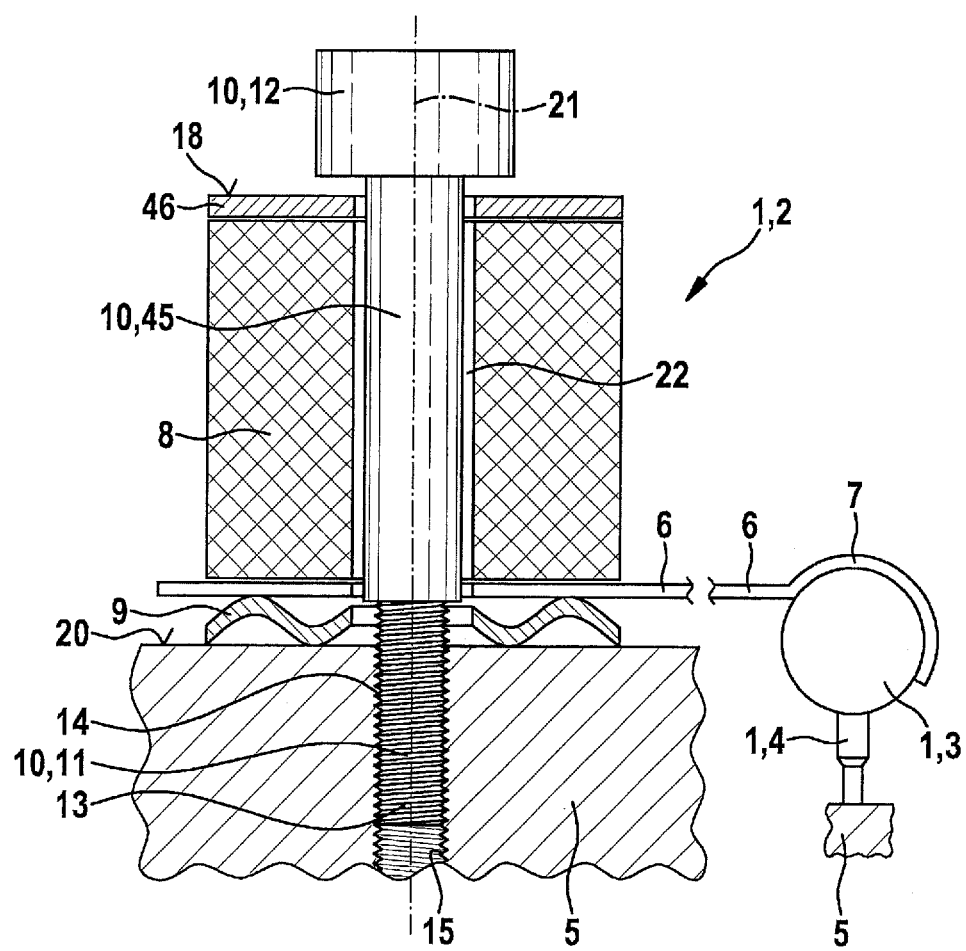
FIG. 4 shows a fuel injection system having a holder, which is used to fasten the fuel distributor on an internal combustion engine, in a cutaway, schematic sectional representation corresponding to a third exemplary embodiment of the present invention.

FIG. 4 shows a fuel injection system 1 having a holder 2, which is used to fasten fuel distributor 3 to an internal combustion engine 5, in a cutaway, schematic sectional representation according to a third exemplary embodiment. In this exemplary embodiment, fastening arrangement 10 has a collar 45 which is provided between head 12 and bolt 11 having winding 14. When fastening arrangement 10 is screwed into tapped bore 15, collar 45 comes into contact with the upper side 20 of internal combustion engine 5.

Because of that, the prestressing of damping element 8 is limited in the initial state and specified precisely. In addition, a fastening force, by the use of which fastening arrangement 10 are screwed in, may thereby be greater than a prestressing force with which damping element 8 and spring element 9 are acted upon.

Moreover, a supporting plate 46 is provided, which is situated between head 12 of fastening arrangement 10 and damping element 8, in order to achieve an homogeneous action upon damping element 8 along axis 21.

The present invention is not restricted to the exemplary embodiments described.

What is claimed is:

1. A holder for fastening a component to an internal combustion engine, comprising:
    at least one elastically deformable damping element;
    a holder body; and
    a spring element, which are situated lying one behind the other with regard to an axis of a fastening arrangement, wherein, in response to an assembly using the fastening arrangement, there is a prestressing of the spring element and a prestressing of the damping element, wherein a stiffness of the spring element in an unstressed state is less than a stiffness of the damping element in the unstressed state, and wherein the stiffness of the spring element in an assembled state is greater than the stiffness of the damping element in the assembled state,
    wherein the holder body is situated between the damping element and the spring element,
    wherein an axial bore extends through the elastically deformable damping element, the holder body and the spring element, through which a bolt of the fastening arrangement penetrates.

2. The holder of claim 1, further comprising:
    a further elastically deformable damping element, wherein the holder body is situated between the elastically deformable damping element and the further elastically deformable damping element.

3. The holder of claim 1, wherein the spring element is at least one of a metallic spring element, a disk-shaped, and a wave-shaped spring element, or wherein the spring element is a helical spring.

4. The holder of claim 1, wherein the elastically deformable damping element, the holder body and the spring element are situated lying one behind the other between a first stressing element and a second stressing element.

5. The holder of claim 1, wherein the bolt of the fastening arrangement has at least one screw thread for fastening to the internal combustion engine, the prestressing of the spring element and the prestressing of the damping element being appliable via screwing in the screw thread.

6. The holder of claim 1, wherein the elastically deformable damping element is configured based on at least one elastomer.

7. The holder of claim 1, wherein the component is a fuel distributor.

8. A fuel-injection system, comprising:
    a fuel distributor; and
    at least one holder for fastening the fuel distributor on an internal combustion engine, wherein the at least one holder includes:
        at least one elastically deformable damping element;
        a holder body; and
        a spring element, which are situated lying one behind the other with regard to an axis of a fastening arrangement, wherein, in response to an assembly using the fastening arrangement, there is a prestressing of the spring element and a prestressing of the damping element, wherein a stiffness of the spring element in an unstressed state is less than a stiffness of the damping element in the unstressed state, and wherein the stiffness of the spring element in an assembled state is greater than the stiffness of the damping element in the assembled state,
    wherein the holder body is situated between the damping element and the spring element,
    wherein an axial bore extends through the elastically deformable damping element, the holder body and the spring element, through which a bolt of the fastening arrangement penetrates.

9. The holder of claim 1, wherein the stiffness of the spring element is a spring constant of the spring element.

10. The holder of claim 1, wherein the stiffness of the damping element is a quotient having a dividend that is a product of a modulus of elasticity of the damping element and an effective cross sectional area of the damping element, and a divisor that is equal to an unstressed length of the damping element.

11. The fuel-injection system of claim 8, wherein the stiffness of the spring element is a spring constant of the spring element.

12. The fuel-injection system of claim 8, wherein the stiffness of the damping element is a quotient having a dividend that is a product of a modulus of elasticity of the damping element and an effective cross sectional area of the damping element, and a divisor that is equal to an unstressed length of the damping element.

* * * * *